(12) United States Patent
Rochon et al.

(10) Patent No.: US 7,835,399 B2
(45) Date of Patent: Nov. 16, 2010

(54) IP HEADER COMPRESSION CONTEXT IDENTIFIER SYNERGISM

(75) Inventors: Michel Rochon, Kanata (CA); Adrian Alfred Ellsworth, Stittsville (CA); Vernon Joshua Stanley Dennis, Kanata (CA)

(73) Assignee: Alcatel Lucent, Paris (FR)

( * ) Notice: Subject to any disclaimer, the term of this patent is extended or adjusted under 35 U.S.C. 154(b) by 116 days.

(21) Appl. No.: 12/349,343

(22) Filed: Jan. 6, 2009

(65) Prior Publication Data

US 2010/0172375 A1 Jul. 8, 2010

(51) Int. Cl.
*H04L 12/56* (2006.01)
*H04J 3/18* (2006.01)

(52) U.S. Cl. .................... 370/474; 370/477; 370/392

(58) Field of Classification Search ................. 370/470, 370/474, 477, 392, 252
See application file for complete search history.

(56) References Cited

U.S. PATENT DOCUMENTS

| | | | |
|---|---|---|---|
| 6,967,964 B1 * | 11/2005 | Svanbro et al. ............. | 370/437 |
| 7,366,105 B2 * | 4/2008 | Yi et al. ....................... | 370/252 |
| 7,486,700 B2 * | 2/2009 | Miyazaki et al. ............ | 370/477 |
| 7,583,701 B2 * | 9/2009 | Miyazaki et al. ............ | 370/477 |
| 7,599,371 B1 * | 10/2009 | Brainos et al. .............. | 370/392 |
| 7,606,267 B2 * | 10/2009 | Ho et al. ..................... | 370/477 |
| 7,693,186 B2 * | 4/2010 | Bunn et al. .................. | 370/474 |
| 2007/0058679 A1* | 3/2007 | Pelletier et al. ............. | 370/477 |
| 2007/0115964 A1* | 5/2007 | Srinivasan et al. .......... | 370/389 |
| 2007/0147366 A1* | 6/2007 | Babbar et al. ............... | 370/389 |

* cited by examiner

*Primary Examiner*—Kwang B Yao
*Assistant Examiner*—Candal Elpenord
(74) *Attorney, Agent, or Firm*—Kramer & Amado, P.C.

(57) ABSTRACT

Various exemplary embodiments relate to a method and related network node including one or more of the following: establishing a plurality of flows; assigning a context identifier to each flow, wherein a length of each context identifier for a first subset of the flows is a first number of bits and a length of each context identifier for a second subset of the flows is a second number of bits greater than the first number of bits; receiving a packet associated with a new flow, wherein a value of a context identifier assigned to the new flow must fit within the first number of bits; determining that the context identifiers for the plurality of flows have occupied all values within the first number of bits; assigning a context identifier of an existing flow to the new flow; and assigning a new context identifier to the existing flow.

20 Claims, 4 Drawing Sheets

IP HEADER COMPRESSION CONTEXT IDENTIFIER SYNERGISM

TECHNICAL FIELD

Embodiments disclosed herein relate generally to compression of Internet Protocol (IP) headers and, more particularly, to assignment of compression context identifiers to packet flows.

BACKGROUND

Modern packet-switched networks accommodate a greater number of users and larger amount of traffic than ever before. Unfortunately, the services desired by users now require a much greater amount of bandwidth, while demanding near real-time service in many cases. Consider, for example, a typical user's experience with a mobile phone. While, several years ago, many users were content with voice-only service, many mobile phones now double as personal computers, providing access to streaming video, peer-to-peer applications, and other high bandwidth applications. Furthermore, non-mobile networks have also experienced a significant increase in traffic, as Voice Over Internet Protocol (VoIP), IP Television (IPTV), and similar services have gradually increased in popularity.

Service providers have struggled to keep pace with the ever-increasing bandwidth requirements. Given the significant expenses associated with adding additional equipment, service providers are reluctant to address this problem by simply increasing the capacity of the network. Instead, many service providers desire to decrease costs and simultaneously improve the user's quality of experience by optimizing the efficiency of data transfer over the network.

One such optimization relates to compression of headers associated with packets transferred over the network. In bandwidth-sensitive portions of the network, many service providers employ a header compression algorithm to decrease the amount of data sent over the network. More specifically, during an initialization phase, a node known as a compressor sends a full header including a context identifier, which identifies the flow associated with the packet. A node known as a decompressor receives the full header and stores the associated context identifier. Subsequently, the compressor may send a "compressed" version of the header, which includes the context identifier, but omits much of the information included in the full header. Because the decompressor maintains a record of the context identifier and associated header information, the decompressor may reconstruct the full header using the information contained in the compressed version.

Given the differences in the fields contained in packets of different protocols, header compression algorithms must identify each packet and deal with the packet depending on its protocol, as a full header may include different fields. For example, the full header of some non-Transmission Control Protocol (TCP) packets, such as User Datagram Protocol (UDP) packets, includes two usable packet length fields, such that the first packet sent by the compressor may include a two-byte context ID. In contrast, the full header of other non-TCP packets, such as IP-only packets, may only include one packet length field, such that the first packet sent by the compressor may include only a one-byte context ID. Thus, the number of context IDs available for use with an IP-only packet may be only 256 (i.e. the values from 0 to 255).

Current header compression algorithms implemented at the compressor fail to effectively consider these differences when assigning context identifiers. More specifically, current header compression algorithms treat all non-TCP packets the same, such that the compressor may assign every possible one-byte context ID to a number of flows, including UDP flows. In this situation, after all one-byte values have been assigned, the compressor will be unable to establish a compression context for an IP-only flow. As a result, the headers for the IP-only flow will not be compressed, such that a significant amount of bandwidth will be wasted.

For the foregoing reasons and for further reasons that will be apparent to those of skill in the art upon reading and understanding this specification, there is a need for packet header compression that effectively assigns compression context identifiers such that a maximal number of flows may be compressed, while also minimizing memory requirements of the compressor and decompressor.

SUMMARY

In light of the present need for effective assignment of compress context identifiers, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method and related network node including one or more of the following: establishing a plurality of flows; assigning a context identifier to each flow, wherein a length of each context identifier for a first subset of the flows is a first number of bits and a length of each context identifier for a second subset of the flows is a second number of bits greater than the first number of bits; receiving a packet associated with a new flow, wherein a value of a context identifier assigned to the new flow must fit within the first number of bits; determining that the context identifiers for the plurality of flows have occupied all values within the first number of bits; assigning a context identifier of an existing flow to the new flow; and assigning a new context identifier to the existing flow.

Accordingly, various exemplary embodiments ensure that IP header compression is enabled for as many flows as possible, such that bandwidth is efficiently utilized. Furthermore, various exemplary embodiments alleviate the need to assign certain flows (e.g. IP/UDP flows) at the end of the context identifier space, thereby reducing the memory requirements at the decompressor, as context identifiers with a lower number of bits are used first.

BRIEF DESCRIPTION OF THE DRAWINGS

In order to better understand various exemplary embodiments, reference is made to the accompanying drawings, wherein.

DETAILED DESCRIPTION

Figure 1:
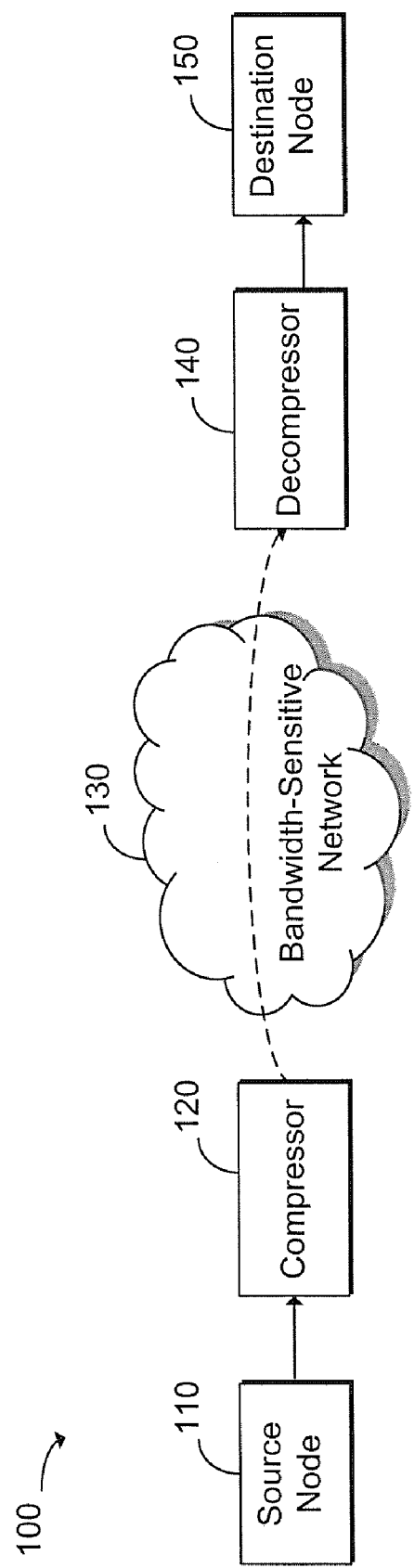
FIG. 1 is a schematic diagram of an exemplary system for packet header compression, the system implementing improved context identifier assignment.

Referring now to the drawings, in which like numerals refer to like components or steps, there are disclosed broad aspects of various exemplary embodiments.

FIG. 1 is a schematic diagram of an exemplary system 100 for packet header compression, the system 100 implementing improved context identifier assignment. In various exemplary embodiments, system 100, which may be a telecommunications network, includes source node 110, compressor 120, bandwidth-sensitive network 130, decompressor 140, and destination node 150.

Source node 110 may be any device that transmits data to destination node 150. Thus, source node 110 may be, for example, a user node, such as a cell phone, personal digital assistant, personal or laptop computer, wireless email device, or any other device that supports wireless communications. Alternatively, source node 110 may be a network node that is responsible for forwarding data originating from a user node, such as a router or switch. As another alternative, source node 110 may be a service provider, server, or similar system that provides data to a user.

In various exemplary embodiments, compressor 120 is a network node that receives data packets from source node 110, performs header compression on the packets, then forwards the packets to decompressor 140 through bandwidth sensitive network 130. Thus, compressor 120 may be a radio network controller, packet data serving node, or any other node located in a position in the network where compression of outgoing packet headers would be advantageous. Alternatively, compressor 120 may be the same node as source node 110, such that source node 110 performs the compression itself.

The header compression performed by compressor 120 may be accomplished in accordance with Request For Comments (RFC) 2507, published by the Internet Engineering Task Force. Thus, compressor 120 may receive a packet from source node 110, determine the type of packet, then determine an appropriate context identifier for the flow associated with the packet. The context identifier may be any value used to uniquely identify a flow between compressor 120 and decompressor 140. Thus, the context identifier may be, for example, a non-negative integer suitable for storage in 8 bits (values 0 to 255) or 16 bits (values 0 to 65,535) that is incremented each time a new flow is established. Values of a different number of bits may be used simultaneously, provided that the context identifiers are kept unique. Compressor 120 may also generate a value known as the generation, which is a value that is incremented or otherwise modified each time the context is changed. After generating the context identifier and generation value, compressor 120 may store these values for subsequent retrieval.

When a packet received at compressor 120 is the first packet in a flow, compressor 120 may assign a new context identifier and generation to the flow, then send a full header for the packet to decompressor 140. The full header may include the context identifier, generation, and all information required to identify the flow and reconstruct a full packet header. The context identifier may be placed in, for example, the packet length field of the header or be used in lieu of the packet header.

When a received packet is a subsequent packet in the flow, compressor 120 may access the information in the packet header, look up the corresponding context identifier and generation, then send a compressed packet including the context identifier and generation. For full headers, the context identifier may be placed in the packet length field of the header. Alternatively, for compressed packets, the context identifier may be used in lieu of the packet header. The compressed packet may exclude information that remains constant between packets, such as the source address, source port, destination address, destination port, time-to-live (TTL), etc. It should be noted that compressor 120 need not send a compressed header for every subsequent packet. In particular, compressor 120 may periodically send a full header to ensure that decompressor 140 has received and maintained the proper context identifier.

In various exemplary embodiments, compressor 120 may implement an improved process for context identifier assignment. In particular, compressor 120 may distinguish between packets belonging to a first subset of flows that require a context identifier of a first number of bits and packets belonging to a second subset of flows that use a larger number of bits. As an example, IP-only packets, such as those used for many proprietary mobile protocols, include a single packet length field of 16 bits, which must be used for both the context identifier and the generation IP/UDP packets, on the other hand, include two packet length fields, one in the IP header and one in the UDP header. As a result, when compressor 120 uses the packet length field to transmit the context identifier, the context identifier for IP-only packets may be only eight bits, while the context identifier for IP/UDP packets may be sixteen bits.

As described in further detail below, compressor 120 may preferentially assign values within the first number of bits to packets in the first subset of flows. Thus, continuing the foregoing example, upon determining that all 8 bit values context identifiers have been assigned, compressor 120 may "steal" a context identifier already assigned to an IP/UDP flow for assignment to a new IP-only flow, then increment the generation associated with the context identifier. This ensures that packet header compression may be implemented for as many flows as possible, thereby minimizing usage of bandwidth in bandwidth-sensitive network 130. Upon receipt of the next packet associated with the IP/UDP flow, compressor 120 may then assign a new context identifier and generation.

After generating or retrieving a context identifier for a particular flow, compressor 120 may send the packet including a full or compressed header across bandwidth-sensitive network 130. Bandwidth-sensitive network 130 may be any network for which compression of headers is advantageous. For example, bandwidth-sensitive network 130 may be a mobile portion of a Global System for Mobile Communications (GSM), Universal Mobile Telecommunications System (UMTS), or other wireless network. Alternatively, bandwidth-sensitive network 130 may be a portion of a network in which satellite-based communications are implemented. Still further, bandwidth-sensitive network 130 may be a portion of a wireline network in which bandwidth is limited, such as T1 or DS1 leased lines. Suitable variations of bandwidth-sensitive network 130 will be apparent to those of ordinary skill in the art.

Decompressor 140 may be a network node that receives data packets from compressor 120, performs header decompression on the packets, then forwards the packets to destination node 150. Thus, decompressor 140 may be a radio network controller, packet data serving node, or any other node. Alternatively, decompressor 140 may be the same node as destination node 150, such that destination node 150 performs the decompression itself.

At initiation of a flow or during periodic context identifier updates, decompressor 140 may obtain a full header from compressor 120. This header may contain, for example, a source IP address, source port, destination IP address, destination port, and any other information stored in packet headers that will be apparent to those of ordinary skill in the art. The full header contains a context identifier and generation value for the flow. Decompressor 140 extracts the context identifier and generation value, and stores these values along with the other header information.

Subsequently, when decompressor 140 receives a compressed header from compressor 120, decompressor 140 extracts the context identifier and generation. Using the extracted context identifier and generation, decompressor 140 accesses the stored header information, then generates a packet header including all information originally contained in the full header received at compressor 120. Then, decompressor 140 may forward a packet including the full header to destination node 150.

Destination node 150 may be any device that receives data transmitted from source node 110. Thus, as with source node 110, destination node 150 may be, for example, a user node, a router or switch, a service provider, a server, or a similar system that receives data from a user or other network node.

Figure 2:
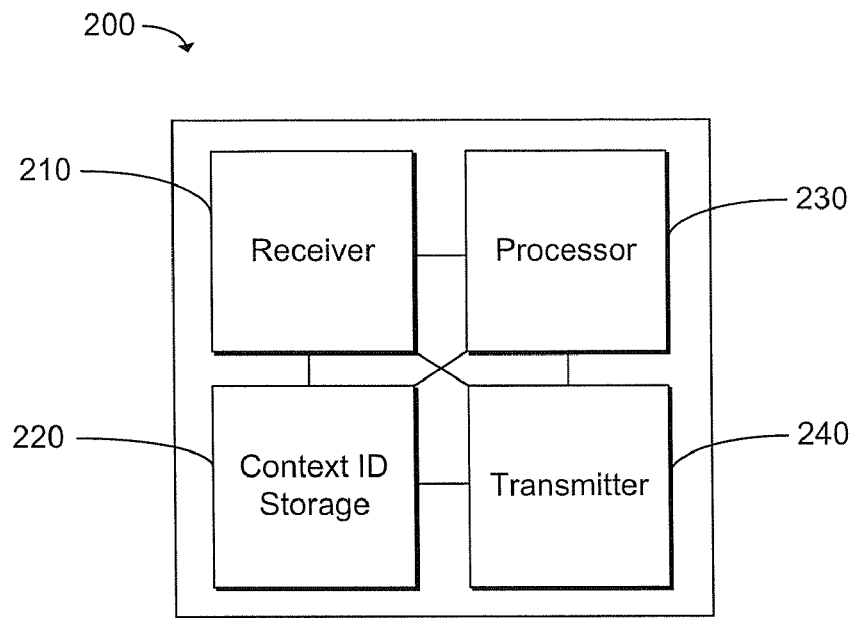
FIG. 2 is schematic diagram of an exemplary compressor for use in the system of FIG. 1.

FIG. 2 is schematic diagram of an exemplary compressor 200 for use in system 100 of FIG. 1. In various exemplary embodiments, compressor 200 includes a receiver 210, context identifier storage 220, a processor 230, and a transmitter 240. As will be apparent from the following description, each of these components may communicate with one or more of the other components to implement the functionality of compressor 200.

Receiver 210 may include hardware and/or software encoded on a machine-readable storage medium configured to receive data from another network node. The hardware included in receiver 210 may be, for example, a network interface card that receives packets and other data. Thus, receiver 210 may be configured to receive a packet associated with a flow for which header compression is required. Receiver 210 may then provide this packet to processor 230, such that processor 230 may generate a full or compressed header.

Context identifier storage 220 may comprise a set of context identifier information encoded on a machine-readable storage medium. Thus, context identifier storage 220 may be, for example, a table in a database that stores the information required to identify a flow, along with the context identifier and generation. Context identifier storage 220 may also include a data structure identifying context identifiers that are suitable candidates to be "stolen." As an example, this data structure may indicate all 8 bit identifiers that are currently occupied by IP/UDP flows. An exemplary data structure for use in context identifier storage 220 is described in further detail below with reference to FIG. 7.

Processor 230 may be hardware and/or software instructions encoded on a machine-readable storage medium. Thus, processor 230 may be a Field Programmable Gate Array (FPGA), an Application-Specific Integrated Circuit, or a general purpose microprocessor. Processor 230 may be configured to manage the assignment of context identifiers to packet flows handled by compressor 200.

Thus, upon receipt of a packet associated with a flow at receiver 210, processor 230 may be configured to access context identifier storage 220 to determine whether compressor 200 has already established a context identifier for the flow. When processor 230 determines that a context identifier has already been assigned for the identified flow, processor 230 may retrieve the assigned context identifier and generation from context identifier storage 220. The methods used for identification of the flow include use of a hash table, ternary content-addressable memory (TCAM), and other methods that will be apparent to those of skill in the art.

In contrast, when processor 230 has not yet established a context identifier for the flow, processor 230 may query context identifier storage 220 to identify a suitable context identifier. This context identifier may be, for example, an incremented or decremented value of the previous context identifier. Similarly, the generation value may be assigned by beginning at a starting value and incrementing for each subsequent generation. This starting value may be 0 at startup or power-up of the line card and may otherwise be the last value used for the generation.

As an alternative, the context identifier assigned by processor 230 may start at different values depending on the protocol associated with the flow. For example, processor 230 may assign context identifiers to IP-only flows by starting at 0 and incrementing each subsequent identifier. Similarly, processor 230 may assign context identifiers to IP/UDP flows by starting at a number greater than 255, such as 1,000, and decrementing each subsequent identifier. This approach ensures that IP-only flows are preferentially assigned 8 bit values, while minimizing the memory required for context identifier storage at the decompressor.

Furthermore, regardless of the method used for assigning context identifiers, processor 230 may reassign a context identifier when the flow associated with the context identifier has expired. Thus, for example, processor 230 may reassign identifiers that were previously assigned as they become available, then return to incrementing or decrementing the last-assigned context identifier. It should be apparent that, when reusing a context identifier, processor 230 increments the generation value to indicate a change in the compression context.

In some situations, when a packet header only includes sufficient space for a context identifier of a fixed number of bits, processor 230 may determine that all possible context identifiers in the fixed number of bits have been assigned. In these cases, processor 230 may access context identifier storage 220 to determine whether there is a suitable flow from which a context identifier may be "stolen" and, when such a flow exists, assign the "stolen" context identifier to the new flow. This could occur, for example, when a packet associated with an IP-only flow is received and all values between 0 and 255 are occupied. Processor 230 may determine a context identifier between 0 and 255 that is currently in use by an IP/UDP flow, then assign this context identifier to the IP-only flow. Processor 230 may subsequently assign a new context identifier to the IP/UDP flow when receiver 210 receives the next packet associated with the flow.

After determining an existing context identifier or assigning a new one, processor 230 may generate a full or compressed header. In particular, for the first packet in the flow and when a periodic update is required, processor 230 may generate a full header including the context identifier and the generation. Exemplary formats of full headers are described in further detail below with reference to FIGS. 3 and 5. Alternatively, for subsequent packets, processor may generate a compressed header including the context identifier and the generation, but excluding one or more values from the packet header. Exemplary formats of compressed headers are described in further detail below with reference to FIGS. 4 and 6.

Transmitter 240 may include hardware and/or software encoded on a machine-readable storage medium configured to send packets to another network node. The hardware included in transmitter 240 may be, for example, a network interface card that sends packets and other data. Thus, transmitter 240 may be configured to receive a packet including a full or compressed header from processor 230, then transmit the packet to a node serving as a decompressor in the telecommunications network.

Figure 3:
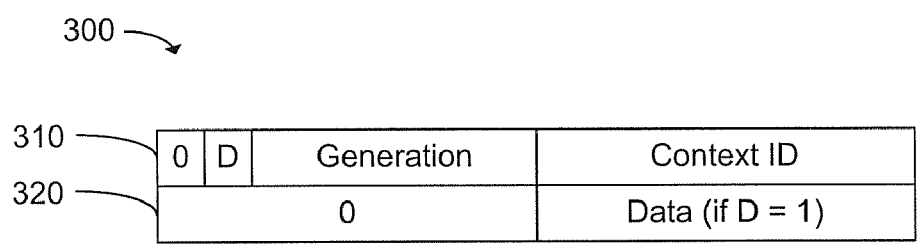
FIG. 3 is a schematic diagram of exemplary length fields for inclusion in a full packet header used with IP-only packets.

FIG. 3 is a schematic diagram of exemplary length fields 300 for inclusion in a full packet header used with IP-only packets. Length fields 300 may be included in a full header to establish a compression context between a compressor and a decompressor upon initialization of a flow or to perform periodic updates of the compression context. Length fields 300 may include a first length field 310 and a second length field 320, each of which may include sixteen total bits.

The value of 0 in the first bit of length field 310 indicates that the context identifier is eight bits in length. The second bit in length field 310 indicates whether the data field in length field 320 will be used. Following the data bit, length field 310 includes a generation value, which may be six bits. As described in further detail above, the generation value changes each time the context between the compressor and decompressor changes. Finally, length field 310 includes a context identifier, which may be eight bits and can therefore hold values between 0 and 255.

Length field 320 may include eight dummy bits set to the value 0. In addition, when the data bit in length field 310 is set to the value 1, the data field of length field 320 may include data for implementing additional compression schemes. For example, this data field may include a sequence number used for coordination of multiple compression schemes. Other suitable uses of the data field will be apparent to those of ordinary skill in the art.

Figure 4:
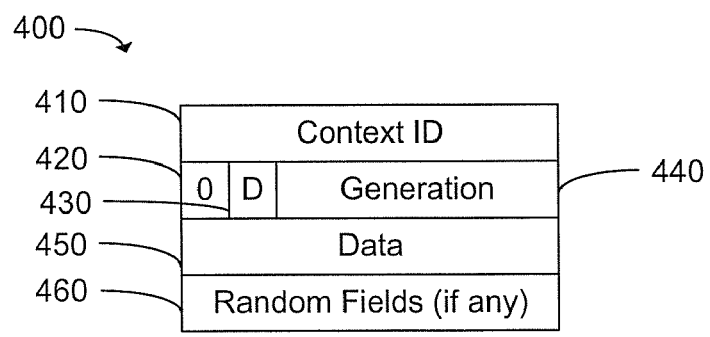
FIG. 4 is a schematic diagram of an exemplary compressed packet header used for IP only-packets.

FIG. 4 is a schematic diagram of an exemplary compressed packet header 400 used for IP only-packets. Compressed packet header 400 may be sent in the place of a full header after establishment of a compression context between a compressor and decompressor. Packet header 400 may include a context ID field 410, length bit 420, data bit 430, generation field 440, data field 450, and random fields 460.

Context ID field 410 may store the context identifier assigned by the compressor when establishing a context for the flow. Thus, the context identifier stored in field 410 is the same as the context identifier transmitted in packet length field 310 of the full header. Header 400 may also include a bit 420 indicating the length of the context identifier (8 bits in this case) and a bit 430 indicating whether additional data is present in header 400. In addition, generation field 440 may transmit the generation established for the flow by the compressor and transmitted in packet length field 310 of the full header.

Additionally, when data bit 430 is set to the value 1, data field 450 may include additional data, as described above with reference to FIG. 3. Finally, random fields 460 may include any packet header information that does not remain constant between packets in the flow. These fields could include, for example, the Res field, M flag, fragment offset, and identification field in a fragment header, authentication data in an authentication header, and the checksum in a UDP header. Other packet header fields that should be included in random fields 460 will be apparent to those of ordinary skill in the art.

Figure 5:
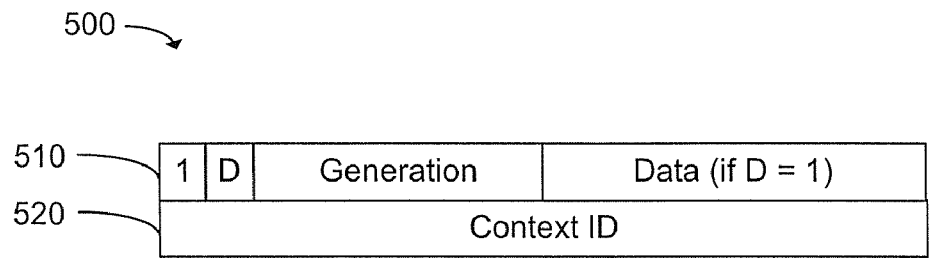
FIG. 5 is a schematic diagram of exemplary length fields for inclusion in a full packet header used with IP/UDP packets.

FIG. 5 is a schematic diagram of exemplary length fields 500 for inclusion in a full packet header used with IP/UDP packets. As described in further detail above, length fields 500 may be included in a full header to establish a compression context between a compressor and a decompressor upon initialization of a flow or to perform periodic updates of the compression context. Length fields 500 may include a first length field 510 and a second length field 520, each of which may include sixteen total bits.

The value of 1 in the first bit of length field 510 indicates that the context identifier is sixteen bits in length. The second bit in length field 510 indicates whether the data field in length field 520 will be used. Following the data bit, length field 510 includes a generation value, which may be six bits. As described in further detail above, the generation value changes each time the context between the compressor and decompressor changes. When the data bit in length field 510 is set to the value 1, the data field of length field 510 may include data for implementing additional compression schemes, as described above with reference to length field 320. Finally, length field 520 includes a context identifier, which may be sixteen bits and can therefore hold values between 0 and 65,535.

Figure 6:
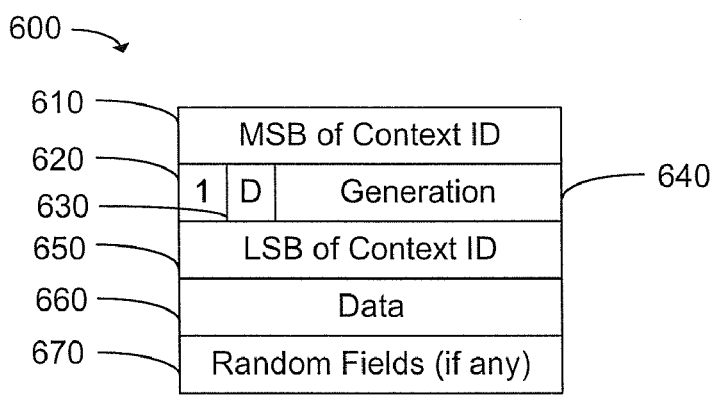
FIG. 6 is a schematic diagram of an exemplary compressed packet header used for IP/UDP packets.

FIG. 6 is a schematic diagram of an exemplary compressed packet header 600 used for IP/UDP packets. As described in further detail above, compressed packet header 600 may be sent in the place of a full header after establishment of a compression context between a compressor and decompressor. Packet header 600 may include a first context ID field 610, length bit 620, data bit 630, generation field 640, second context ID field 650, data field 660, and random fields 670.

First context ID field 610 may store the most significant bits of the context identifier assigned by the compressor when establishing a context for the flow. Thus, the value stored in field 610 represents the eight most significant bits of the context identifier transmitted in packet length field 520 of the full header. As described above with reference to packet length fields 400, header 600 may include a bit 620 indicating the length of the context identifier (16 bits in this case) and a bit 630 indicating whether additional data is present in the header 600. In addition, generation field 640 may transmit the generation established for the flow by the compressor and transmitted in packet length field 510 of the full header.

Additionally, when data bit 630 is set to the value 1, data field 650 may include additional data, as described above with reference to FIG. 3. Second context ID field 650 may store the least significant bits of the context identifier assigned by the compressor when establishing a context for the flow. Thus, the value stored in field 650 represents the eight least significant bits of the context identifier transmitted in packet length field 520 of the full header.

Finally, random fields 670 may include any packet header information that does not remain constant between packets in the flow. These fields could include, for example, the Res field, M flag, fragment offset, and identification field in a fragment header, authentication data in an authentication header, and the checksum in a UDP header. Other packet header fields that should be included in random fields 670 will be apparent to those of ordinary skill in the art.

Figure 7:
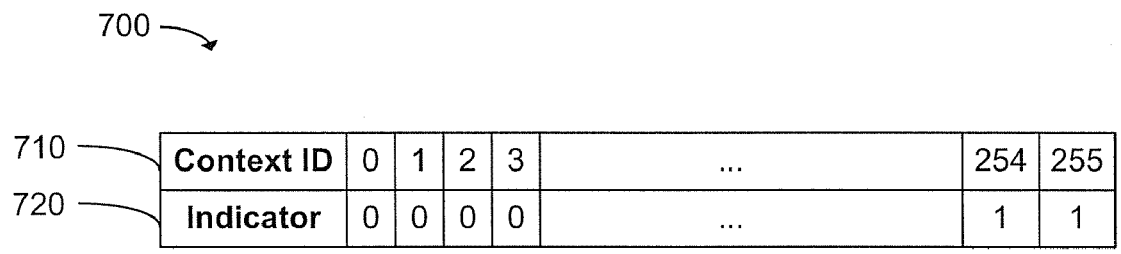
FIG. 7 is a schematic diagram of an exemplary data structure indicating context identifiers occupied by IP/UDP packets.

FIG. 7 is a schematic diagram of an exemplary data structure 700 indicating context identifiers occupied by IP/UDP packets. Data structure 700 may be stored as a bit vector, table, array of data, or any other data structure that will be apparent to those of skill in the art.

A context ID set 710 stores all context identifiers within a first number of bits. For example, with respect to IP-only flows, which must be limited to 8 bits, context ID set 710 may store all context identifiers between 0 and 255, inclusive. Indicator set 720 stores a value indicating whether each context identifier has been assigned to a flow for which a larger number of bits may be used for the context identifier. Stated differently, indicator set 720 may identify candidates for replacement when a context identifier is unavailable for a flow that is preferentially assigned context identifiers (e.g. an IP-only flow).

Thus, as depicted in FIG. 7, the values for context identifiers 0-3 are not currently assigned to an IP/UDP flow. On the other hand, context identifiers 254 and 255 have been assigned to IP/UDP flows. As a result, if upon receipt of a request to establish a context identifier for a new IP-only flow, it is determined that all eight bit identifiers have been used, compressor 200 may access data structure 700. Compressor 200 could then determine that context identifiers 254 and 255 have been assigned to IP/UDP flows and "steal" one of these values for assignment to the new IP-only flow. A new context identifier could then be assigned to the IP/UDP flow upon receipt of the next packet.

It should be apparent that the data structure 700 depicted in FIG. 7 is exemplary. Accordingly, any data structure suitable to store an indication of the context identifiers that have been assigned to a particular type of flow may be used. Suitable alternatives will be apparent to those of ordinary skill in the art.

Figure 8:
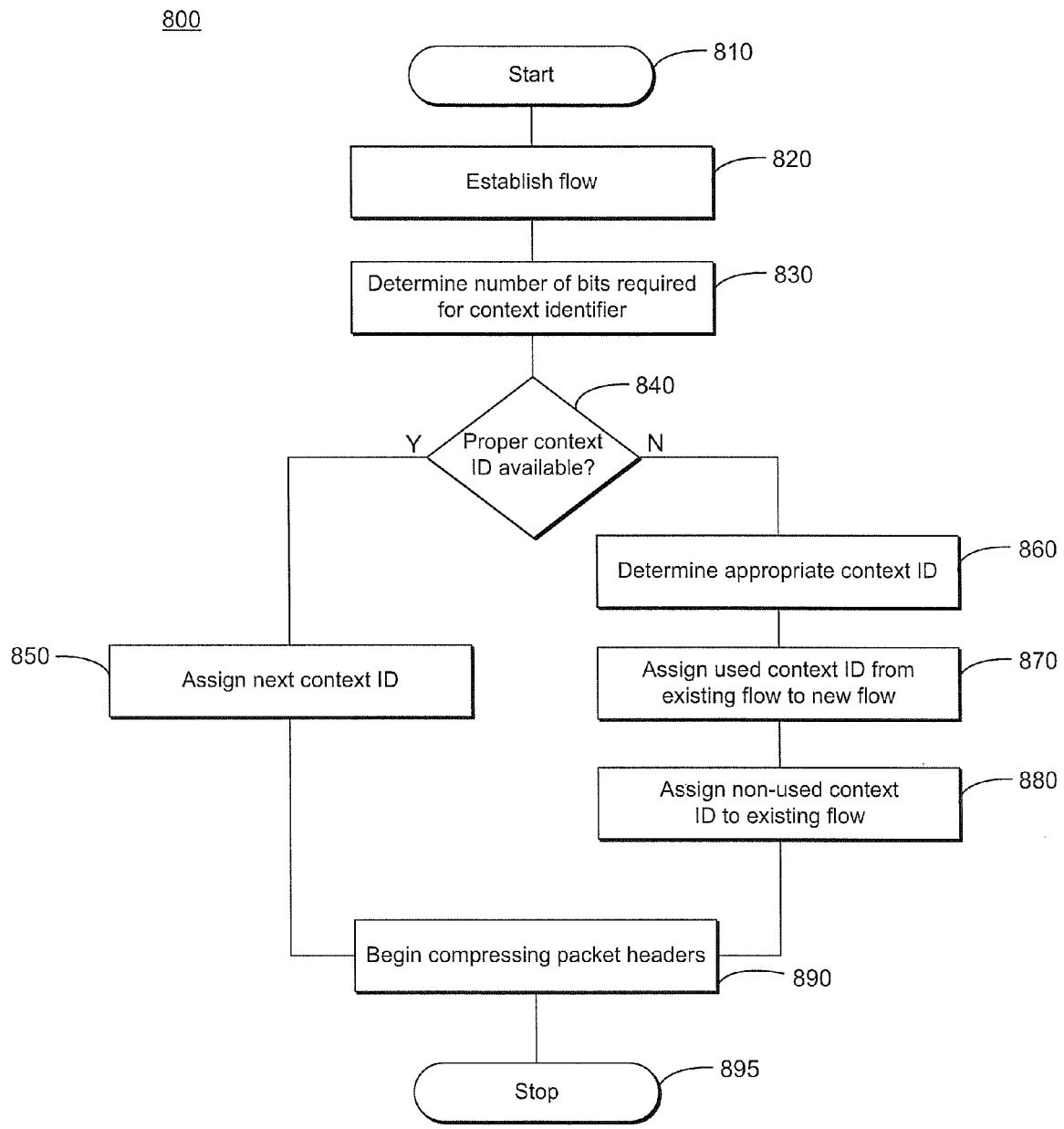
FIG. 8 is a flowchart of an exemplary embodiment of a method for compressing packet headers for transmission across a telecommunications network, the method implementing improved context identifier assignment.

FIG. 8 is a flowchart of an exemplary embodiment of a method 800 for compressing packet headers for transmission across a telecommunications network, the method implementing improved context identifier assignment. Exemplary method 800 starts in step 810 and proceeds to step 820, where a flow is established between a source node 110 and a destination node 150, the path of packets in the flow including a compressor 120 and a decompressor 140. Because the path includes compressor 120, a first packet associated with the flow may be received at compressor 120.

Exemplary method 800 then proceeds to step 830, where compressor 120 determines the number of bits required for the context identifier of the new flow. As an example, when the packet is associated with an IP-only flow, compressor 120 may determine that the context identifier must be 8 bits in length, as only one packet length field is available for transmission of the context identifier. As another example, when the packet is associated with an IP/UDP flow, compressor 120 may determine that the context identifier may be 16 bits in length, as two packet length fields are available.

Exemplary method 800 then proceeds to decision step 840, where compressor 120 determines whether a proper context identifier is available for the flow. More particularly, compressor 120 may access its context identifier storage to determine whether a context identifier within the determined number of bits is available. For example, with respect to an IP-only flow, compressor 120 may determine whether a value between 0 and 255 is available.

When, in decision step 840, it is determined that a proper context identifier is available, exemplary method 800 proceeds to step 850, where compressor 120 assigns a context identifier and generation value to the flow. Compressor 120 may also store the context identifier, generation value, and any other information necessary to identify the flow in its context identifier storage. The context identifier assigned in this step may be determined, for example, by incrementing the last assigned context identifier, such that context identifiers are sequentially assigned to the flows in order of their establishment. Alternatively, for some flows, compressor 120 may begin assigning context identifiers at a larger value, then decrement the context identifier for each new flow. Suitable variations will be apparent to those of ordinary skill in the art.

As an example, compressor 120 may assign context identifiers to IP-only flows by starting at 0 and incrementing each subsequent identifier. Similarly, compressor 120 may assign context identifiers to IP/UDP flows by starting at a number greater than 255, such as 1,000, and decrementing each subsequent identifier. This approach ensures that IP-only flows are preferentially assigned 8 bit values, while minimizing the memory required at the decompressor.

Alternatively, when in decision step 840, it is determined that a proper context identifier is not available, exemplary method 800 proceeds to step 860, where compressor 120 determines an appropriate context identifier for the new flow. In particular, when it is determined that all usable context identifiers for the flow are unavailable, compressor 120 may access a data structure maintained in its context identifier storage to identify a usable context identifier previously assigned to another flow. For example, when all context identifiers between 0 and 255 are assigned and a context identifier is required for a new IP-only flow, compressor 120 may identify an IP/UDP flow that uses one of the values between 0 and 255. Exemplary method 800 then proceeds to step 870, where compressor 120 assigns the used context identifier to the new flow and increments the associated generation value. Assignment of the used context identifier to the new flow may trigger a slow-start mode for the new flow. The slow-start mode is described in further detail below with reference to step 880.

After assigning the used context identifier to the new flow, the existing flow requires a new context identifier. Thus, exemplary method 800 proceeds to step 880, where compressor 120 assigns a new, unoccupied context identifier to the existing flow. For example, compressor 120 may increment or decrement the last-assigned context identifier for assignment to the existing flow. This step may occur when compressor 120 receives the next packet associated with the existing flow.

Furthermore, assignment of a new context-identifier value to the existing flow may trigger a slow-start mode for the existing flow, whereby compressor 120 ensures that decompressor 140 receives the proper context information. In particular, compressor 120 may first send headers in the following order: full header, compressed header, full header, two compressed headers, full header, four compressed headers, and so on. Compressor 120 may similarly execute a slow-start by sending a full header, followed by a number of compressed headers equal to sequential powers of a positive integer (e.g. full header, $3^0=1$ compressed header, full header, $3^1=3$ compressed headers, full header, $3^2=9$ compressed headers, etc.). This sequence may continue until the number of compressed headers reaches a predetermined limit or a given time has elapsed.

After assigning the context identifier in either step 850 or step 880, exemplary method 800 proceeds to step 890, where compressor 120 begins execution of the compression algorithm. In particular, for the first packet in the flow and when a periodic update is required, compressor 120 sends a full header with the corresponding context identifier and generation value. For subsequent packets in the flow, compressor 120 sends a compressed header with the corresponding context identifier and generation value. Exemplary full and compressed headers are described in further detail above with reference to FIGS. 3-6. Exemplary method 800 then proceeds to step 895, where exemplary method 800 stops.

According to the foregoing, various exemplary embodiments ensure that IP header compression is enabled for as many flows as possible, such that bandwidth is efficiently utilized. Furthermore, various exemplary embodiments alleviate the need to assign certain flows (e.g. IP/UDP flows) at the end of the context identifier space, thereby reducing the memory requirements at the decompressor.

It should be apparent from the foregoing description that various exemplary embodiments of the invention may be implemented in hardware, firmware, and/or software. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a network node (e.g. router or switch). Thus, a machine-readable storage medium may include read-only memory (ROM), random-access memory (RAM), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be implemented while remaining within the spirit and scope of the invention. Accordingly, the foregoing disclosure, description, and figures are for illustrative purposes only and do not in any way limit the invention, which is defined only by the claims.

What is claimed is:

1. A method for compressing packet headers for transmission across a telecommunications network, the method comprising:
    establishing a plurality of flows in the telecommunications network, a path of each flow including a first network node functioning as a compressor and a second network node functioning as a decompressor;
    assigning, at the compressor, a context identifier to each flow, wherein a length of each context identifier for a first subset of the flows is a first number of bits and a length of each context identifier for a second subset of the flows is a second number of bits greater than the first number of bits;
    receiving, at the compressor, a packet associated with a new flow, wherein a value of a context identifier assigned to the new flow must fit within the first number of bits;
    determining that the context identifiers for the plurality of flows have occupied all values within the first number of bits;
    assigning, at the compressor, a context identifier to the new flow, wherein the context identifier assigned to the new flow is the context identifier previously assigned to an identified flow in the second subset; and
    assigning a new, unoccupied value for the context identifier of the identified flow in the second subset.

2. The method for compressing packet headers according to claim 1, further comprising:
    sending a first packet of each flow from the compressor to the decompressor, the first packet including a full header with the corresponding context identifier; and
    sending subsequent packets of each flow from the compressor to the decompressor, the subsequent packets including a compressed header with the corresponding context identifier.

3. The method for compressing packet headers according to claim 1, wherein the context identifiers are sequentially assigned to the plurality of flows in an order of establishment of the flows.

4. The method for compressing packet headers according to claim 1, wherein the step of assigning a context identifier to each flow comprises:
    for the first subset of flows, assigning context identifiers starting at a value of zero and continuing to assign context identifiers in ascending order; and
    for the second subset of flows, assigning context identifiers starting at a value greater than a maximum value within the first number of bits and continuing to assign context identifiers in descending order.

5. The method for compressing packet headers according to claim 1, wherein the first number of bits is eight bits and the second number of bits is sixteen bits.

6. The method for compressing packet headers according to claim 5, wherein the first subset of flows includes Internet Protocol (IP) only flows and the second subset of flows includes IP/User Datagram Protocol (UDP) flows.

7. The method for compressing packet headers according to claim 5, wherein packet headers in the first subset of flows include one packet length field and packet headers in the second subset of flows include two packet length fields.

8. The method for compressing packet headers according to claim 1, wherein the step of determining that the context identifiers for the plurality of flows have occupied all values within the first number of bits further comprises:
    accessing a data structure that indicates all context identifiers within the first number of bits that are currently occupied by a flow in the second subset of flows.

9. The method for compressing packet headers according to claim 1, wherein the step of assigning the new, unoccupied value for the context identifier of the identified flow in the second subset occurs when the compressor receives a next packet associated with the identified flow.

10. The method for compressing packet headers according to claim 9, wherein, in response to assigning the new, unoccupied value, the identified flow enters a slow start mode.

11. A network node functioning as a compressor for compressing packet headers for transmission across a telecommunications network, the network node comprising:
    context identifier storage that stores information regarding context identifiers assigned by the network node;
    a receiver that:
        receives packets associated with a plurality of flows in the telecommunications network, a path of each flow including the network node and a second network node functioning as a decompressor, and
        receives a packet associated with a new flow different than the plurality of flows, wherein a value of a context identifier assigned to the new flow must fit within a first number of bits; and
    a processor configured to:
        assign a context identifier to each flow of the plurality of flows, wherein a length of each context identifier for a first subset of the plurality of flows is the first number of bits and a length of each context identifier for a second subset of the plurality of flows is a second number of bits greater than the first number of bits, accesses the context identifier storage to determine whether the context identifiers for the plurality of flows have occupied all values within the first number of bits, when it is determined that the context identifiers for the plurality of flows have occupied all values within the first number of bits, assign a context identifier to the new flow, wherein the context identifier assigned to the new flow is the context identifier previously assigned to an identified flow in the second subset, and assign a new, unoccupied value for the context identifier of the identified flow in the second subset.

12. The network node for compressing packet headers according to claim 11, further comprising a transmitter configured to:

send a first packet of each flow from the compressor to the decompressor, the first packet including a full header with the corresponding context identifier, and send subsequent packets of each flow from the compressor to the decompressor, the subsequent packets including a compressed header with the corresponding context identifier.

13. The network node for compressing packet headers according to claim 11, wherein the context identifiers are sequentially assigned to the plurality of flows in an order of establishment of the flows.

14. The network node for compressing packet headers according to claim 11, wherein the processor is further configured to:

for the first subset of flows, assign context identifiers starting at a value of zero and continuing to assign context identifiers in ascending order, and for the second subset of flows, assign context identifiers starting at a value greater than a maximum value within the first number of bits and continuing to assign context identifiers in descending order.

15. The network node for compressing packet headers according to claim 11, wherein the first number of bits is eight bits and the second number of bits is sixteen bits.

16. The network node for compressing packet headers according to claim 15, wherein the first subset of flows includes Internet Protocol (IP) only flows and the second subset of flows includes IP/User Datagram Protocol (UDP) flows.

17. The network node for compressing packet headers according to claim 15, wherein packet headers in the first subset of flows include one packet length field and packet headers in the second subset of flows include two packet length fields.

18. The network node for compressing packet headers according to claim 11, wherein the context identifier storage further comprises a data structure that indicates all context identifiers within the first number of bits that are currently occupied by a flow in the second subset of flows.

19. The network node for compressing packet headers according to claim 11, wherein the processor assigns the new, unoccupied value for the context identifier of the identified flow in the second subset when the receiver receives a next packet associated with the identified flow.

20. The network node for compressing packet headers according to claim 19, wherein, in response to assignment of the new, unoccupied value, the identified flow enters a slow start mode.

* * * * *